W. E. WALLER.
POULTRY PERCH.
APPLICATION FILED DEC. 28, 1917.
1,262,880.
Patented Apr. 16, 1918.
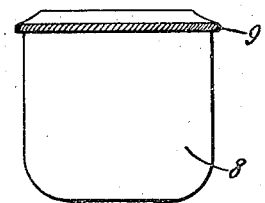
Fig. 1.
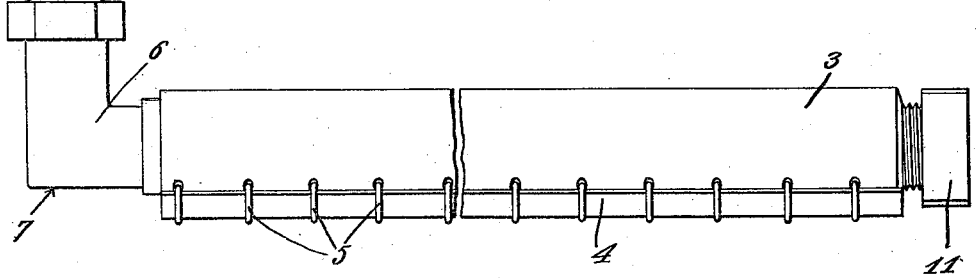
Fig. 2.
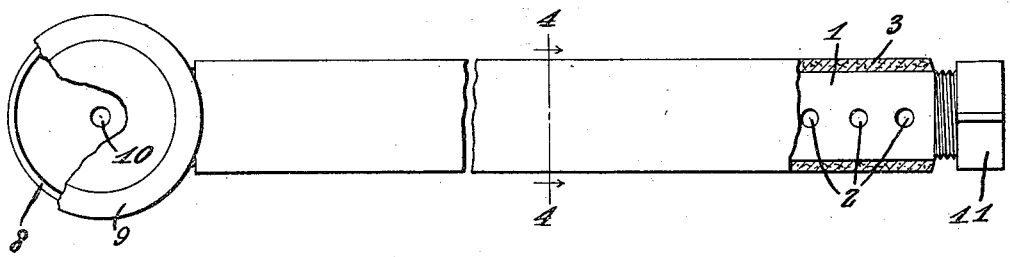
Fig. 3.
Fig. 4.
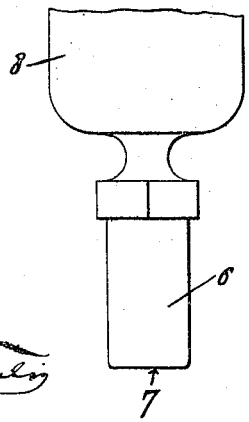
W. E. Waller, Inventor

UNITED STATES PATENT OFFICE.

WARREN E. WALLER, OF CHARLES CITY, IOWA.

POULTRY-PERCH.

1,262,880.

Specification of Letters Patent. Patented Apr. 16, 1918.

Application filed December 28, 1917. Serial No. 209,345.

*To all whom it may concern:*

Be it known that I, WARREN E. WALLER, a citizen of the United States, residing at Charles City, in the county of Floyd and State of Iowa, have invented a new and useful Poultry-Perch, of which the following is a specification.

The subject of this invention is a poultry perch and the main object contemplated by the invention is the provision of a vermin proof perch.

The invention also contemplates the provision of means whereby insecticide may be supplied to the perch.

Another object of the invention is the provision of means for retaining the insecticide which means also forms a protection for the feet of the fowl.

A still further object is the provision of a simple, durable, and efficient perch.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in elevation of a roost the central portion broken out;

Fig. 2 is a plan view of the same, a portion of the covering removed;

Fig. 3 is an end elevation of the roost;

Fig. 4 is a cross section on the line 4—4 of Fig. 2.

Referring to the drawing by numerals of reference:

In carrying out the invention a roost bar is provided which consists of a tubular member 1, preferably made of gas pipe, and which is provided with a plurality of spaced apertures 2 arranged longitudinally thereof and preferably in the top face.

The bar 1 is covered or wound with an absorbent material 3, such as felt, and underlying the bar 1 without the wrapping is a metal trough 4 which is held in place in any suitable manner, as by means of lacings 5 which pass through apertures formed in the covering and beneath the trough.

An elbow 6 is threaded into the end of the tube or pipe 1 and is provided with flat faces as indicated at 7 so as to rest firmly in notches formed in the supporting bars of the roost (not shown) to maintain the roost bar in its proper upright position.

Threaded into the upstanding end of the elbow 6 is the nipple (not shown) of a cup or container 8 which is closed by a threaded cap 9. The cup is in communication with the elbow and hollow bar 1 through a small aperture 10 which extends through the nipple and allows only sufficient of the liquid insecticide, which is contained in the cup 8, to supply the roost to escape.

The outer end of the roost bar 1 may be closed by having a cap 11 threaded thereon, as shown, or an elbow 6 and cup 8 may be threaded thereon.

When the roost is in use, the cup 8 is filled with a suitable insecticide which gradually drips down through the opening 10 into the bar 1 and fills the bar. This liquid is absorbed by the wrapping 3 and serves to keep vermin from the fowls while at roost. The covering or wrapping also serves to keep the feet of the fowls from contact with the metal bar 1 and so protect their feet from undue chilling.

Having thus described the invention, what is claimed as new and sought by Letters Patent, is:—

A fowl roost, including a tubular bar having a series of spaced apertures arranged longitudinally thereof, a container secured to the tubular bar and in communication with the interior thereof, an absorbent covering for the bar, and a trough-shaped metallic strip secured to the covering and extending below and longitudinally of the bar.

In testimony that I claim the foregoing as my own, I have hereto affixed my signature in the presence of two witnesses.

WARREN E. WALLER.

Witnesses:
CARL C. MAGDSICK,
W. LOREN PARR.

Copies of this patent may be obtained for five cents each, by addressing the "Commissioner of Patents, Washington, D. C."